United States Patent [19]
Anspacher

[11] 3,721,410
[45] March 20, 1973

[54] ROTATING SURVEILLANCE VEHICLE

[75] Inventor: William B. Anspacher, Silver Spring, Md.

[73] Assignee: The United States of America as represented by the Secretary of the Navy

[22] Filed: Aug. 29, 1962

[21] Appl. No.: 220,948

[52] U.S. Cl. ............244/3.14, 250/83.3 HP, 178/7.6
[51] Int. Cl. .........F41g 7/00, F42b 13/30, F41g 9/00
[58] Field of Search ...102/50; 244/14, 3.14; 178/7.6, 178/6.7; 343/6; 250/202, 203, 83.3; 346/8

[56] References Cited

UNITED STATES PATENTS

| | | | |
|---|---|---|---|
| 2,891,108 | 6/1959 | Wiens | 178/6.7 |
| 2,931,858 | 4/1960 | Hammond et al. | 178/6.7 |
| 3,010,102 | 11/1961 | Ketchledge et al. | 343/6 IR |
| 3,066,589 | 12/1962 | Beatty | 178/6.7 |
| 3,078,340 | 2/1963 | Willey | 178/6.7 |
| 3,080,816 | 3/1963 | Levine | 250/238 |
| 3,090,583 | 5/1963 | Behun et al. | 250/203 |
| 3,158,337 | 11/1964 | Lannan | 244/1 |

Primary Examiner—Benjamin A. Borchelt
Assistant Examiner—Thomas H. Webb
Attorney—Q. Baxter Warner and R. F. Hossfeld

EXEMPLARY CLAIM

1. A reconnaissance system capable of scanning an inaccessible target area and relaying the information to an observation point where it is displayed for visual observation comprising an infrared transducer means for converting detected infrared radiations into electrical signals proportional to the detected infrared radiations, transmitting means connected to said transducer means for transmitting electrical signals, rotating projectile means rotating at a predetermined rate enclosing said transmitting means and having said transducer means fixedly attached to the outer periphery of the projectile for scanning in a helical path the target area in a fixed rotating relationship with the projectile, at a rate equal to the rotating rate of said projectile receiving means for receiving and demodulating said electrical signals, and visual display means connected to said receiving means for converting electrical signals into a visual representation of the target area.

1 Claim, 3 Drawing Figures

INVENTOR
WILLIAM B. ANSPACHER

ATTORNEYS

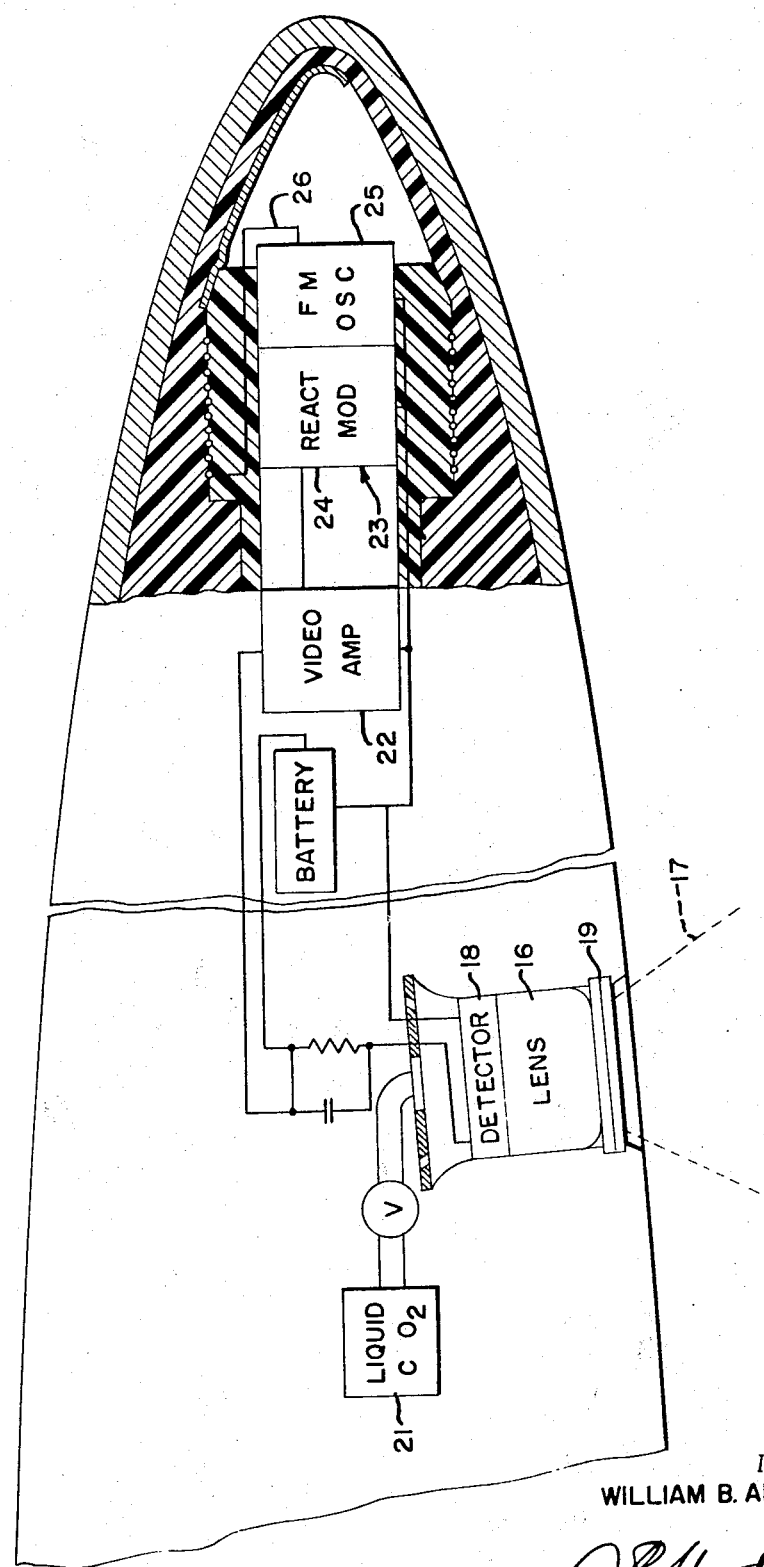

ROTATING SURVEILLANCE VEHICLE

The invention described herein may be manufactured and used by or for the Government of the United States of America for governmental purposes without the payment of any royalties thereon or therefor.

This invention relates to a reconnaissance weapon system and more particularly to a rotating reconnaissance vehicle that makes use of the forward motion and spin of the vehicle in conjunction with an optical system to scan the terrain below and transmit the information back to a receiver station where the information is fed into an oscilloscope for visual or recorded observation.

In the field of enemy reconnaissance it has been the general practice to employ aircraft, either drone or manned, or combat troops located in observation posts in strategic locations. Battle field reconnaissance by forward ground troops or aircraft generally do not provide satisfactory artillery fire control data, for the relative locations of field pieces, the observer and the target are virtually impossible to specify with accuracy. At best only corrective fire control data are provided by this type of surveillance, and the ground observer or the airborne observation post are vulnerable to enemy action.

The general purpose of this invention is to provide a reconnaissance weapon system that will be launched from a gun or other type launcher that is capable of observing an inaccessible area suspected of having enemy troop movements such as tanks or trucks. The projectile contains an optical detecting system such, for example, as an infrared detecting device mounted on the periphery of the projectile which utilizes the forward motion and spin of the projectile to scan the ground below. Information from the optical system is telemetered back to the gun enplacement where it may be presented for visual observation and recorded on tape or film. This information would then be used to direct gun fire to the target providing for the destruction of the target on the first lethal shell fired. Observation of enemy movements could be determined by comparing the information received from two different reconnaissance projectiles.

It is an object of the present invention to provide a reconnaissance projectile having an optical system for viewing the terrain over which it passes and a transmitter for relaying such information back to a receiver for interpretation.

Another object is to provide a reconnaissance vehicle that may be projected over a given terrain and the information observed by the reconnaissance vehicle transmitted to a remote receiving station.

A further object is to provide a reconnaissance vehicle that may be used for observing target movements in inaccessible terrain during both the night and day periods.

Still another object is to provide a reconnaissance vehicle capable of detecting and telemetering information regarding enemy-held terrain without the enemy knowing that he is being observed.

Further objects and the entire scope of the invention will become further apparent from the following detailed description and in the appended claims. The accompanying drawings display the general construction and operational principles of the invention; it is to be understood, however, that the drawings are furnished only by way of illustration and not in limitation thereof.

In the drawings:

FIG. 2 is a sectional view of the reconnaissance vehicle; and

Figure 1:
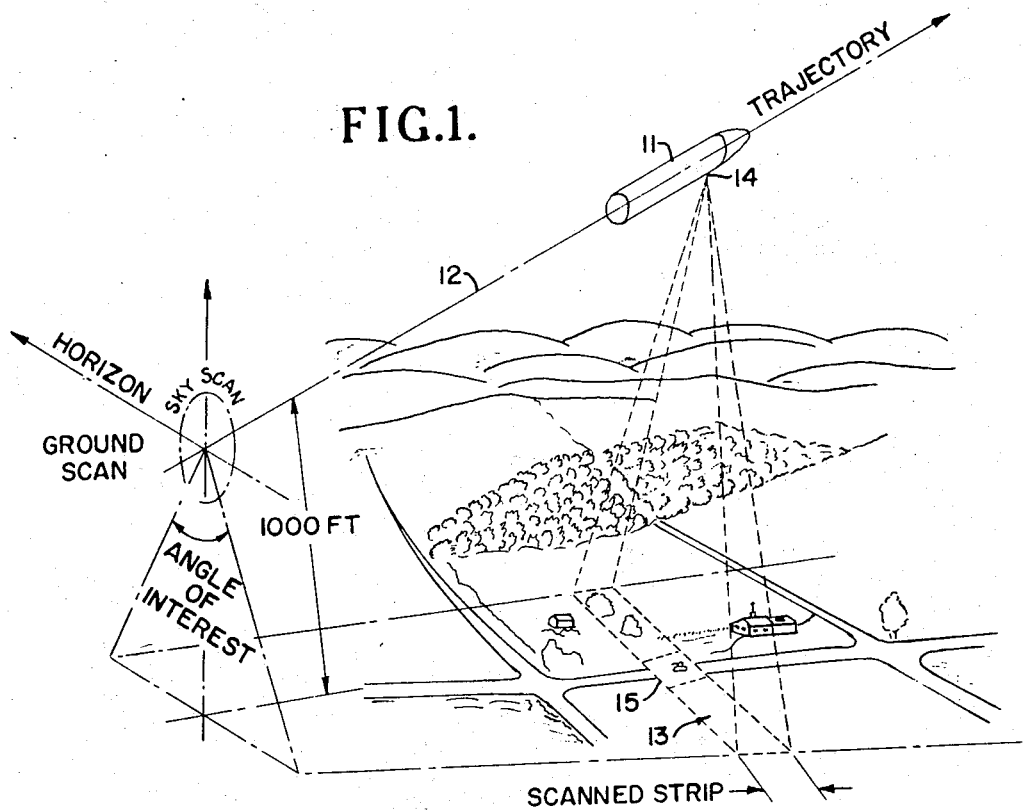
FIG. 1 is a plan view of the reconnaissance vehicle embodying the principles of this invention scanning the terrain over which it is passing.

Referring now to the drawings, wherein like reference numerals designate like parts throughout the several views, there is shown in FIG. 1 a reconnaissance vehicle 11 in a trajectory path 12 scanning a strip 13 as it rotates in the trajectory path. While applicant does not intend to be limited by the size or velocity or spin of the reconnaissance vehicle it has been found that the various components may easily be mounted in a 5 inch shell. Upon being fired this shell has a forward velocity of approximately 2,000 feet per second and a spin of 200 revolutions per second. The detector 14 in the projectile will sweep through a helical path advancing 10 feet for each complete revolution which is accomplished in 5.0 milliseconds. With the detector in the optical system having a beam extending radially perpendicular to the projectile axis, the optical system will alternately view or scan progressive sections of the sky and ground as it is rotated and advanced in the trajectory. At a height of approximately 1,000 feet, with a 0.5° × 0.5° beam projected onto the ground the optical system will view a square area 15 approximately 10 feet on each side and as the projectile rotates a 10 foot strip along the ground will be scanned. Since the reconnaissance vehicle advances ten feet per complete revolution the strips scanned on successive revolutions will be immediately adjacent to each other. In application, the reconnaissance vehicle is projected over the inaccessible area by explosives and the viewing area may be limited to the ground surface as indicated in FIG. 1 to the area within the angle of interest which would be the ground surface immediately below the projectile. The area of interest will be scanned in a fractional rotation of the projectile and the area of interest may be determined or varied by the equipment receiving the signal.

Assuming that the tank or truck is the target desired to be detected and it is within the area of interest, it can easily be seen that, the optical system will intercept the target at least once during the scanning process. The resolution of the target on the scope, of FIG. 3, will indicate the presence of a target of the assumed size without providing too many of the structural details. The target will be scanned in approximately 10 microseconds and in resolving the checkerboard pattern of 10 foot squares of varying infrared rays will provide a fundamental signal frequency of approximately 50 kilocycles. The optical system as shown in FIG. 2 utilizes a lens 16 to provide a square pencil beam 17 of approximately 0.05° and focuses the energy from the target onto the detector 18. While this invention may utilize several different detectors, the preferred embodiment has been limited to a single infrared detector for sake of simplicity. The detector 18 may be a lead selenide detector of the type manufactured by Santa Barbara Research Corporation and the Radio Corporation of America and uses an indium antimonide filter 19 which will pass only infrared rays having a wavelength from 8 to 13 microns. Infrared rays in this wavelength will detect the targets of military interest such, for example, as tanks and trucks. The degree of sensitivity obtained from the detector 18 will largely depend upon the degree of cooling obtained therefor. By expanding liquid carbon dioxide 21 over the detector 18, the detector may be cooled down to about −78° C. Centrifugal force keeps the liquid $CO_2$ on the detector until it evaporates. By utilizing other gases, for example, oxygen or argon in lieu of carbon dioxide, a temperature of −196° or −186°C respectively may be obtained. If additional cooling is required for the types of IR detectors it is contemplated that the detector could be removed and cooled by equipment on the site and then placed in the reconnaissance vehicle where the expanding gas would provide the second stage cooling. The operating temperatures of the various detectors is fully described in a book entitled Infrared Technology Generation, Transmission and Detection by Kruse, McGlauchlin and McQuinton copyrighted 1962. The basic frequency generated by the infrared detector 18 will be approximately 50 kilocycles but this signal may have frequency components exceeding 100,000 kilocycles per second depending upon signal devices found in the terrain. The signals from the infrared detector 18 are fed into a video amplifier 22 where they are amplified and the output is used to frequency modulate the telemetering system 23. The telemetering system includes a reactance modulator 24 connected to the video amplifier. The reactance modulator 24 is used to modulate the FM oscillator 25. The reconnaissance vehicle utilizes a FM transmission to relay the information to the receiving center of FIG. 3. The FM signal generated by oscillator 25 is radiated by an antenna 26 located in the nose of the reconnaissance vehicle of FIG. 2. The antenna is a loop-dipole radiator that generates an asymmetrical antenna pattern similar to that described in a book entitled "Principles of Radio Engineering" by R. S. Glasgow, published in 1936. The notch in the resulting cardioid pattern may be used for gating the incoming signal and for limiting the visual signal to the area of interest.

Figure 3:
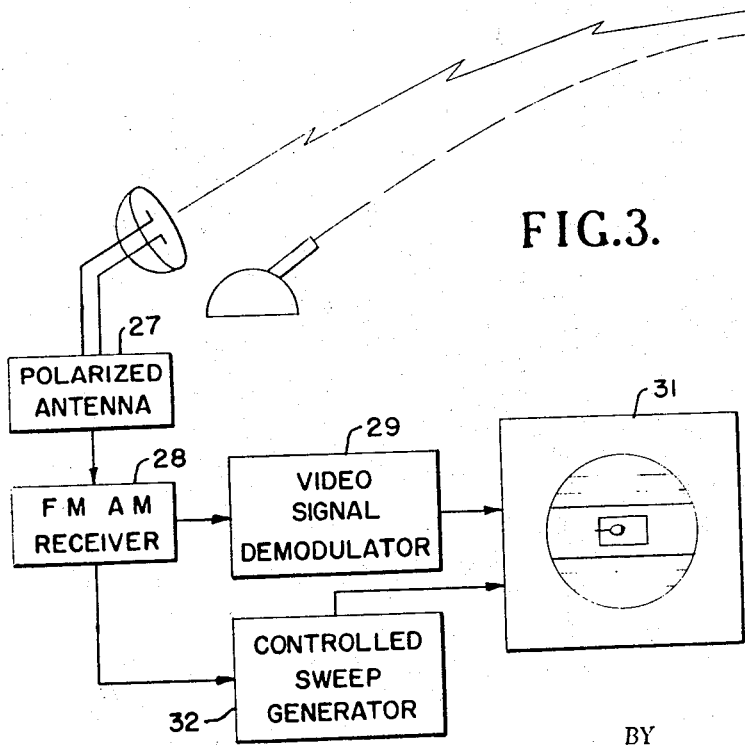
FIG. 3 is a block diagram of the receiving apparatus used to detect and record the signals intercepted from the reconnaissance vehicle of FIG. 1.

The frequency modulated carrier signal modulated by the scanned infrared signal is received by a vertical polarized antenna 27 of FIG. 3 and is fed into an FM-AM receiver 28. The FM output of the FM-AM receiver is fed into a video signal demodulator 29 and the video signal is fed into an oscilloscope 31. The AM portion of the FM-AM receiver differentiates the cardioid signal to detect the directional characteristics of the FM signal. This directional signal is used to control the sawtooth sweep generator 32 for the oscilloscope display as is well known in the art. In this manner the scope sweep may be used to limit the display of the oscilloscope to the angle of interest on the ground scanned. The demodulated video signal fed into the oscilloscope is utilized as an intensity modulator on the beam of the oscilloscope to represent the image as viewed by the IR detector. The video display will be limited to various shades of black and white depending upon the radiation given off by the area scanned. Obviously this signal can be recorded on a high speed film camera or on video tape so that the differences between two reconnaissance vehicles may be easily observed.

By utilizing a filter that passes infrared rays in the 8 to 13 micron wavelength region, the reconnaissance vehicle may be used during the day or night as desired. This filter eliminates most of the reflected sunlight during the day time and only the radiation that is emitted by the objects on the ground will be detected. The interpretation of the scanned images will vary depending on whether the area has been scanned in the day time or night time since the detector unit detects a thermal image. The thermal image during the day time is substantially hotter than it is in the night time. It has been found that during the day enemy vehicles are not as easily detected if covered by a large amount of foliage but that during the night time these same vehicles are considerably hotter than the surrounding foliage and are easily detected.

While applicant has shown only one detector in a reconnaissance vehicle it is considered obvious that two or three detectors could be placed in each vehicle if desired. For example, if two detectors were placed in a reconnaissance vehicle at opposite sides of the vehicle one detector would be operating along the ground scan while the other one was in the quiescent condition because of its position in the sky scan. If, for example, three or more detectors were utilized it would be necessary to provide two or more telemetering links for transmitting the detected information.

It has been found that this reconnaissance vehicle can provide some information even on cloudy days where other forms of reconnaissance would be impossible.

In operation, the reconnaissance vehicle is fired from a gun along a known trajectory. The detector senses the variation of infrared rays given off by objects on the ground and the resulting signal is amplified and used to modulate the FM carrier signal. The modulated carrier is detected at the receiver station where it is demodulated and fed into an oscilloscope. Due to the speed of the reconnaissance vehicle and the retention ability of the eye, large sections of the terrain will be continuously observed by the receiving stations while the vehicle is in flight.

Obviously many modifications and variations of the present invention are possible in the light of the above teachings. It is therefore to be understood, that within the scope of the appended claims, the invention may be practiced otherwise than as specifically described.

What is claimed is:

1. A reconnaissance system capable of scanning an inaccessible target area and relaying the information to an observation point where it is displayed for visual observation comprising an infrared transducer means for converting detected infrared radiations into electrical signals proportional to the detected infrared radiations, transmitting means connected to said transducer means for transmitting electrical signals, rotating projectile means rotating at a predetermined rate enclosing said transmitting means and having said transducer means fixedly attached to the outer periphery of the projectile in a fixed rotating relationship with the projectile for scanning in a helical path the target area at a rate equal to the rotating rate of said projectile, receiving means for receiving and demodulating said electrical signals, and visual display means connected to said receiving means for converting electrical signals into a visual representation of the target area.

* * * * *